(12) United States Patent  
Hoffman et al.

(10) Patent No.: US 8,376,889 B2
(45) Date of Patent: Feb. 19, 2013

(54) TRANSMISSION PRODUCING CONTINUOUSLY VARIABLE SPEED RATIOS

(75) Inventors: Donald E. Hoffman, Canton, MI (US); David A. Janson, Plymouth, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 303 days.

(21) Appl. No.: 12/961,807

(22) Filed: Dec. 7, 2010

(65) Prior Publication Data

US 2011/0165985 A1    Jul. 7, 2011

(51) Int. Cl.
*F16H 15/48* (2006.01)
(52) U.S. Cl. .................................. 475/189; 475/218
(58) Field of Classification Search .............. 475/189, 475/207, 218, 219
See application file for complete search history.

(56) References Cited

U.S. PATENT DOCUMENTS

| | | | | |
|---|---|---|---|---|
| 2,874,592 A * | 2/1959 | Oehrli | ............................ | 475/115 |
| 3,688,600 A * | 9/1972 | Leonard | .......................... | 475/54 |
| 3,765,270 A * | 10/1973 | Lemieux | ....................... | 475/115 |
| 6,358,179 B1 * | 3/2002 | Sakai et al. | .................... | 475/216 |
| 2001/0024987 A1* | 9/2001 | Ooyama | ....................... | 475/207 |
| 2001/0041640 A1* | 11/2001 | Sakai et al. | ................... | 475/207 |
| 2011/0165986 A1* | 7/2011 | Hoffman et al. | .............. | 475/214 |

* cited by examiner

*Primary Examiner* — Sherry Estremsky
(74) *Attorney, Agent, or Firm* — James Dottavio; MacMillan, Sobanski & Todd, LLC (57) ABSTRACT

A transmission includes an input, a variator including an output and a ball carrier secured to the input, producing a variable speed ratio between the ball carrier and the output, a gearset including a component connected to the output, and second and third components, a first clutch releaseably connecting the input and the second component, and a second clutch releaseably connecting the component and the third component.

20 Claims, 6 Drawing Sheets

Fig. 1

|  | Pinion | Gear |
|---|---|---|
| Final Drive | 19 | 77 |
| Variator Transfer Gearset | 28 | 95 |
| First Mode Gearset | 47 | 102 |

Fig. 2

| Mixing Planetary 32 | |
|---|---|
| Sun 60 | 38 |
| Ring 64 | 77 |
| Pinion 66 | 19 |
| Beta | 2.2063 |

Fig. 3

| Mode | Variator Speed Ratio | 46 Var. Output | 22 Var.Gear Output | 26 Mode 1 Gear Out | 60 Sun Gear | 64 Ring Gear | 62 Carrier | 14 FD Input | FD Output |
|---|---|---|---|---|---|---|---|---|---|
| 1st Mode | 6.2500 | 6.2500 | -1.8421 | -0.4608 | -1.8421 | 0.2209 | -0.4608 | 0.2209 | -0.0545 |
| 1st Mode | 4.7313 | 4.7313 | -1.3945 | -0.4608 | -1.3945 | 0 | -0.4608 | 0 | 0 |
| 1st Mode | 1.5634 | 1.5634 | -0.4608 | -0.4608 | -0.4608 | -0.4608 | -0.4608 | -0.4608 | 0.1137 |
| 2nd Mode | 1.5634 | 1.5634 | -0.4608 | -0.4608 | -0.4608 | -0.4608 | -0.4608 | -0.4608 | 0.1137 |
| 2nd Mode | 2.7214 | 2.7214 | -0.8021 | -0.4608 | -0.8021 | -0.8021 | -0.8021 | -0.8021 | 0.1979 |
| 2nd Mode | 6.2500 | 6.2500 | -1.8421 | -0.4608 | -1.8421 | -1.8421 | -1.8421 | -1.8421 | 0.4545 |

| | Pinion | Gear |
|---|---|---|
| Final Drive | 19 | 94 |
| Variator Transfer Gearset | 19 | 75 |
| Mode 1 Gearset | 34 | 86 |
| Mode 3 Gearset | 57 | 36 |

Fig. 6

| Mixing Planetary 32,102 | |
|---|---|
| Sun 60 | 37 |
| Ring 64 | 66 |
| Pinion 66 | 14 |
| Beta | 1.7838 |

Fig. 7

| | Mode 1 Clutch 28 | Mode 2 Clutch 30 | Mode 3 Clutch 76 |
|---|---|---|---|
| Mode 1 | X | | |
| Mode 2 | | X | |
| Mode 3 | | | X |

Fig. 8

| Mode | Variator Speed Ratio | 46 Var. Output | 22 Var.Gear Output | 26 Mode 1 Gear Out | 72 Mode 3 Gear In | 74 Mode 3 Gear Out | 60 Sun Gear | 64 Ring Gear | 62 Carrier |
|---|---|---|---|---|---|---|---|---|---|
| 1st Mode | 6.2500 | 6.2500 | -1.5833 | -0.3953 | 1.0000 | -1.5833 | -1.5833 | 0.2706 | -0.3953 |
| 1st Mode | 4.3443 | 4.3443 | -1.1006 | -0.3953 | 1.0000 | -1.5833 | -1.1006 | 0.0000 | -0.3953 |
| 1st Mode | 1.5606 | 1.5606 | -0.3953 | -0.3953 | 1.0000 | -1.5833 | -0.3953 | -0.3953 | -0.3953 |
| 2nd Mode | 1.5606 | 1.5606 | -0.3953 | -0.3953 | 1.0000 | -1.5833 | -0.3953 | -0.3953 | -0.3953 |
| 2nd Mode | 2.7185 | 2.7185 | -0.6887 | -0.3953 | 1.0000 | -1.5833 | -0.6887 | -0.6887 | -0.6887 |
| 2nd Mode | 6.2500 | 6.2500 | -1.5833 | -0.3953 | 1.0000 | -1.5833 | -1.5833 | -1.5833 | -1.5833 |
| 3rd Mode | 6.2500 | 6.2500 | -1.5833 | -0.3953 | 1.0000 | -1.5833 | -1.5833 | -1.5833 | -1.5833 |
| 3rd Mode | 3.5879 | 3.5879 | -0.9089 | -0.3953 | 1.0000 | -1.5833 | -0.9089 | -1.9614 | -1.5833 |
| 3rd Mode | 1.5606 | 1.5606 | -0.3953 | -0.3953 | 1.0000 | -1.5833 | -0.3953 | -2.2493 | -1.5833 |

| Mode | 14 FD Input | FD Output |
|---|---|---|
| 1st Mode | 0.2706 | -0.0547 |
| 1st Mode | 0.0000 | 0.0000 |
| 1st Mode | -0.3953 | 0.0799 |
| 2nd Mode | -0.3953 | 0.0799 |
| 2nd Mode | -0.6887 | 0.1392 |
| 2nd Mode | -1.5883 | 0.3200 |
| 3rd Mode | -1.5883 | 0.3200 |
| 3rd Mode | -1.9614 | 0.3965 |
| 3rd Mode | -2.2493 | 0.4547 |

| Mode | Variator Speed Ratio | 46 Var. Output | 84 Var.Gear Input | 86 Var.Gear Output | 90 Mode 1 Gear Out | 98 Mode 3 Gear In | 100 Mode 3 Gear Out | 108 Sun Gear | 110 Ring Gear |
|---|---|---|---|---|---|---|---|---|---|
| 1st Mode | 6.2500 | 6.2500 | 6.2500 | -1.5833 | -0.3953 | 0.2497 | -0.3953 | -1.5833 | 0.2706 |
| 1st Mode | 4.3443 | 4.3443 | 4.3443 | -1.1006 | -0.3953 | 0.2497 | -0.3953 | -1.1006 | 0 |
| 1st Mode | 1.5606 | 1.5606 | 1.5606 | -0.3953 | -0.3953 | 0.2497 | -0.3953 | -0.3953 | -0.3953 |
| 2nd Mode | 1.5606 | 1.5606 | 1.5606 | -0.3953 | -0.3953 | 0.2497 | -0.3953 | -0.3953 | -0.3953 |
| 2nd Mode | 2.7185 | 2.7185 | 2.7185 | -0.6887 | -0.3953 | 0.4350 | -0.6887 | -0.6887 | -0.6887 |
| 2nd Mode | 6.2500 | 6.2500 | 6.2500 | -1.5833 | -0.3953 | 1.0000 | -1.5833 | -1.5833 | -1.5833 |
| 3rd Mode | 6.2500 | 6.2500 | 6.2500 | -1.5833 | -0.3953 | 1.0000 | -1.5833 | -1.5833 | -1.5833 |
| 3rd Mode | 3.5879 | 3.5879 | 3.5879 | -0.9089 | -0.3953 | 1.0000 | -1.5833 | -0.9089 | -1.9614 |
| 3rd Mode | 1.5606 | 1.5606 | 1.5606 | -0.3953 | -0.3953 | 1.0000 | -1.5833 | -0.3953 | -2.2493 |

| Mode | 106 Carrier | 14 FD Input | FD Output |
|---|---|---|---|
| 1st Mode | -0.3953 | 0.2706 | -0.0547 |
| 1st Mode | -0.3953 | 0 | 0 |
| 1st Mode | -0.3953 | -0.3953 | 0.0799 |
| 2nd Mode | -0.3953 | -0.3953 | 0.0799 |
| 2nd Mode | -0.6887 | -0.6887 | 0.1392 |
| 2nd Mode | -1.5833 | -1.5883 | 0.3200 |
| 3rd Mode | -1.5833 | -1.5883 | 0.3200 |
| 3rd Mode | -1.5833 | -1.9614 | 0.3965 |
| 3rd Mode | -1.5833 | -2.2493 | 0.4547 |

Fig. 13

TRANSMISSION PRODUCING CONTINUOUSLY VARIABLE SPEED RATIOS

BACKGROUND OF THE INVENTION

1. Field of the Invention

This invention relates generally to the powertrain of a motor vehicle, and more particularly to a transmission having a variator that produces a stepless, continuously variable range of speed ratios.

2. Description of the Prior Art

An efficient transmission that requires minimum space and is able to produce a continuously variable range of speed ratios is required to optimize fuel economy and performance of motor vehicles equipped with a relatively small engine, particularly in a transverse, front-wheel-drive arrangement of the engine and transmission.

SUMMARY OF THE INVENTION

A transmission includes an input, a variator including an output and a ball carrier secured to the input, producing a variable speed ratio between the ball carrier and the output, a gearset including a component connected to the output, and second and third components, a first clutch releaseably connecting the input and the second component, and a second clutch releaseably connecting the component and the third component.

The transmission includes a ball variator and requires a smaller package space than transmissions that incorporate other variators.

Because fewer gears are in the power path as compared to transmissions having other variators, particularly half or full toroidal variator, the overall mechanical efficiency of the transmission is improved.

While operating in third mode of the triple mode embodiments, the powerflow is split, such that the variator only sees part of the input power, thereby reducing variator efficiency losses.

The scope of applicability of the preferred embodiment will become apparent from the following detailed description, claims and drawings. It should be understood, that the description and specific examples, although indicating preferred embodiments of the invention, are given by way of illustration only. Various changes and modifications to the described embodiments and examples will become apparent to those skilled in the art.

DESCRIPTION OF THE DRAWINGS

The invention will be more readily understood by reference to the following description, taken with the accompanying drawings, in which.

DESCRIPTION OF THE PREFERRED EMBODIMENT

Figure 1:
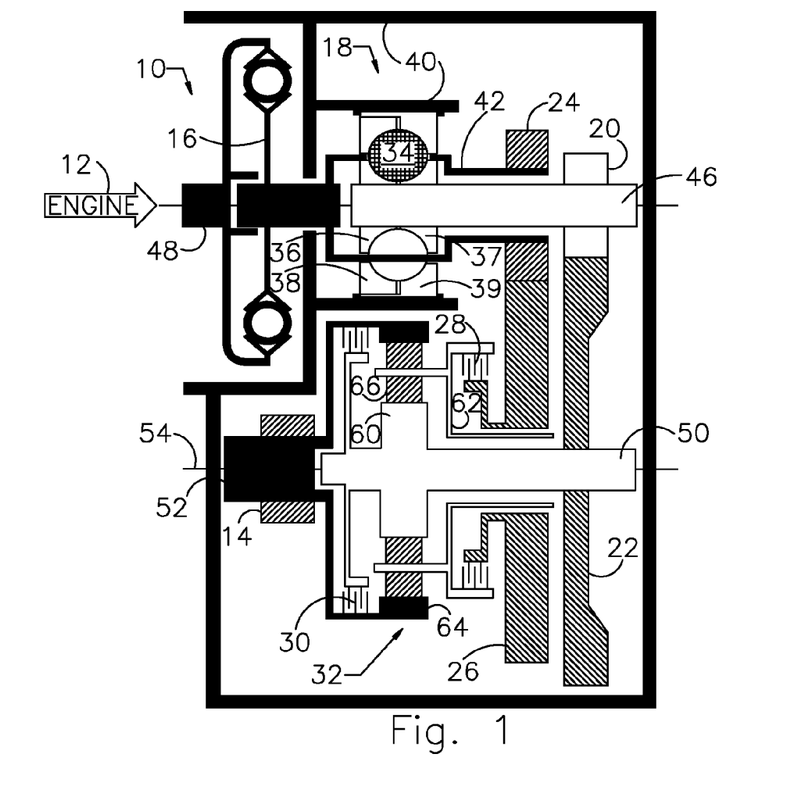
FIG. 1 is a schematic diagram of a dual-mode continuously variable transmission.

Referring now to the drawings, FIG. 1 illustrates a transmission 10 for transmitting power between an engine 12 and a final drive pinion 14. The transmission 10 includes a torsional damper 16; a Milner ball variator 18; a transfer gearset comprising pinion 20 and gear 22; a first mode gearset comprising pinion 24 and gear 26; a first mode clutch 28; a second mode clutch 30; and a mixing planetary gearset 32. Pinion 24 is secured to the variator ball carrier 42, which is secured to the transmission input. Pinion 20 is secured to shaft 46, and gear 22 is secured to shaft 50.

The Milner ball variator 18 includes spherical balls 34 and is a type of variable geometry, 4-point contact ball bearing. The inner race is divided in two parts 36, 37, and the outer race is divided in two parts 38, 39. By varying the axial distance between the parts of the outer race 38, 39 the distance between the parts of the inner race 36, 37 changes and the balls 34 are displaced radially between the inner and outer races. As the position of the balls changes relative to the races, the location of the contact between the balls 34 and the races varies, thereby changing the speed ratio of the variator.

The ball carrier 42, which is driveably connected through torsion damper 16 to engine shaft 48, is the input to variator 18 and transmission 10. The outer races 38, 39 are grounded, i.e., held against rotation on the case 40. The inner races 36, 37 are the variator output and are secured to shaft 46.

The variator 18 is combined with the mixing planetary gearset 32, the transfer gearset 20-22, first mode gearset 24-26, and clutches 28, 30 to produce a multi-mode transmission. Power is transmitted toward layshaft 50 from the variator shaft 46. In forward drive, shaft 52, the transmission output centered at axis 54, rotates in the opposite direction from that of engine shaft 48. The final drive pinion 14 is in mesh with a final drive gear located on a differential/wheel centerline. The ball variator 18 is preferentially located on the shaft 46.

For operation in the first mode, first mode clutch 28 is engaged, second mode clutch 30 is disengaged, and the variator 18 is combined with mixing planetary 32, the variator transfer gearset 20-22 and the first mode gearset 24-26. The first mode produces reverse drive and low range forward drive, in which the variator output 46 is connected to the sun gear 60 of the mixing planetary gearset 32 through the variator transfer gearset 20-22. A second element of the mixing planetary gearset 32, carrier 62, is connected to the output of the first mode gearset 24-26 due to engagement of the first mode clutch 28. A third element of the mixing planetary gearset 32, ring gear 64, is connected to the output 52 of the transmission 10. Planet pinions 66 are supported on carrier 62 and mesh with sun gear 60 and ring gear 64.

For operation in the second mode, first mode clutch 28 is disengaged, and second mode clutch 30 is engaged. The second mode is the high-mode, in which the variator output 46 is connected through the variator transfer gearset 20-22, shaft 50 and second mode clutch 30 to the output 52, bypassing the mixing planetary gearset 32.

With proper selection of the planetary gearset beta ratio, i.e., the ratio of the pitch diameter of ring gear 64 and the pitch diameter of sun gear 60, and the speed ratios of the transfer gearsets 20-22, 24-26, operation in low-mode will produce reverse drive, neutral, and low speed forward drive ranges. In addition, a node point is produced, at which the overall speed ratios in first mode and second mode overlap to allow smooth switching between modes.

Figure 2:
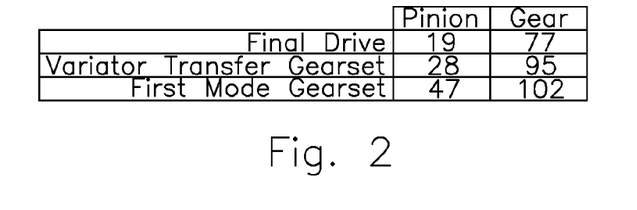
FIG. 2 shows preferred number of gear teeth of the transfer gearset, first mode gearset and the final drive of the transmission of FIG. 1.

FIG. 2 shows the preferred number of gear teeth of the variator transfer gearset 20-22, first mode gearset 24-26 and the final drive pinion 14 and its meshing final drive gear (not shown).

Figure 3:
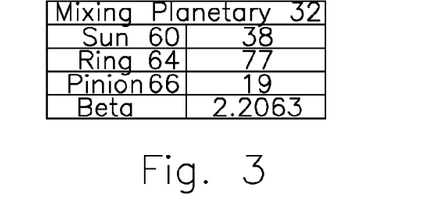
FIG. 3 shows the beta ratio and a preferred number of gear teeth of the sun gear, ring gear and planet pinions of the mixing planetary gearset of the transmission of FIG. 1.

FIG. 3 shows the beta ratio, and a preferred number of gear teeth of sun gear 60, ring gear 64 and planet pinions 66 of the mixing gearset 32.

Figure 4:
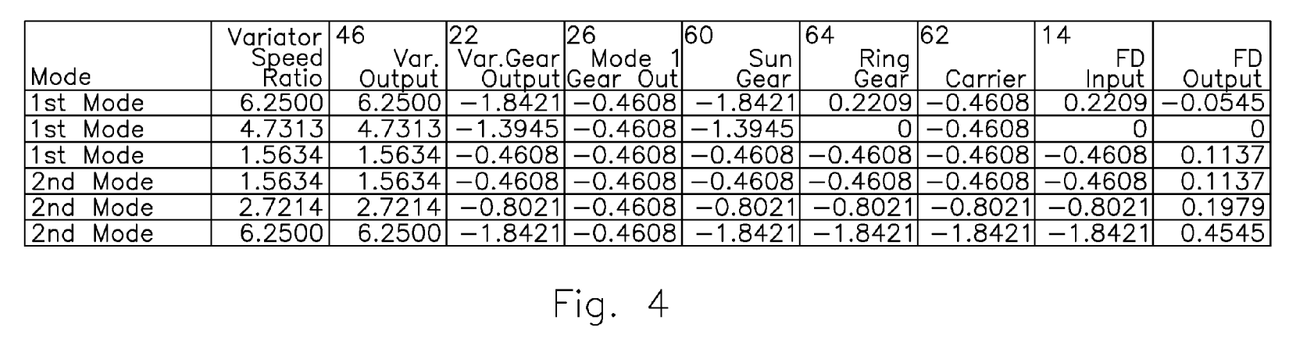
FIG. 4 is a chart showing the variation of the speed ratios of system components as the variator speed ratio changes in the transmission of FIG. 1.

As FIG. 4 shows, during a positive torque condition with transmission 10 operating in the first mode, the speed ratio of variator 18 at its maximum 6.2500 and engine speed at reference speed 1.000, the speed of the variator output 46 is 6.2500, gear 22 and sun gear 60 is −1.8421, gear 26 and carrier 62 is −0.4608, ring gear 64 and final drive pinion 14 is 0.2209, and the final drive output is −0.0545.

The final drive output speed is zero when the speed ratio of variator 18 decreases to 4.7313 during first mode operation. The final drive output speed is 0.1137 when the speed ratio of variator 18 decreases further to 1.5634 during first mode operation.

During a positive torque condition with transmission 10 operating in the second mode, with speed ratio of variator 18 at its minimum 1.5634 and engine speed is 1.000, the speed of the variator output 46 is 1.5634, gear 22 and sun gear 60 is −0.4608, gear 26 is −0.4608, carrier 62 is −0.4608, ring gear 64 and final drive pinion 14 is −0.4608, and the final drive output is 0.1137.

The final drive output speed is 0.1979 when the speed ratio of variator 18 increases to 2.7214 during second mode operation. The final drive output speed is 0.4545 when the speed ratio of variator 18 increases further to 6.250 during second mode operation.

Figure 5:
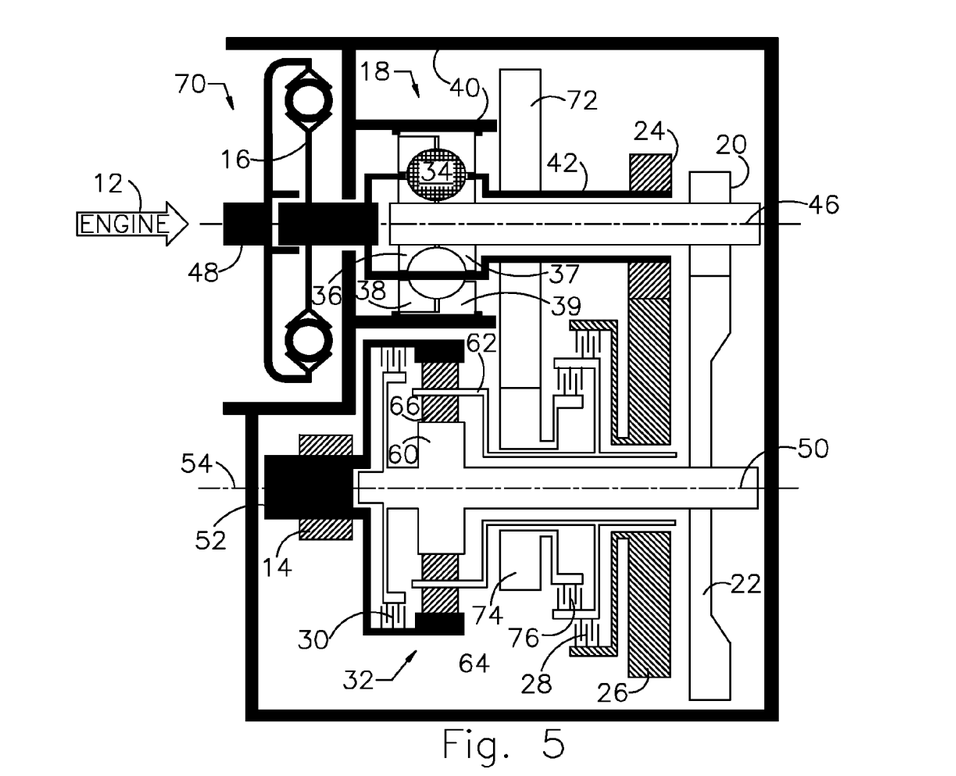
FIG. 5 is a schematic diagram of a triple-mode continuously variable transmission.

In addition to the components of the dual-mode transmission 10 of FIG. 1, the triple-mode transmission 70 of FIG. 5 includes a third mode transfer gearset, comprising a pinion 72 secured to input 42 and a gear 74 meshing with pinion 72 and journalled on carrier 62; and a third mode clutch 76, which alternately driveably connects and disconnects gear 74 and carrier 62.

During operation in the third mode, the output 46 of variator 18 is connected to one component of the mixing planetary gearset 32, e.g. sun gear 60, through the transfer gearset 20-22, a second component of planetary gearset 32, e.g., carrier 62 is connected to the output of the third mode gearset 72-74 due to the engagement of clutch 76, and a third component of planetary gearset 32, e.g., ring gear 64, is connected to the final drive output pinion 14.

With proper selection of beta, the speed ratios, and the ratio range of variator 18, there is a node point at which the overall ratios of second mode and third mode overlap to allow smooth switching between the second and third modes.

Figure 6:
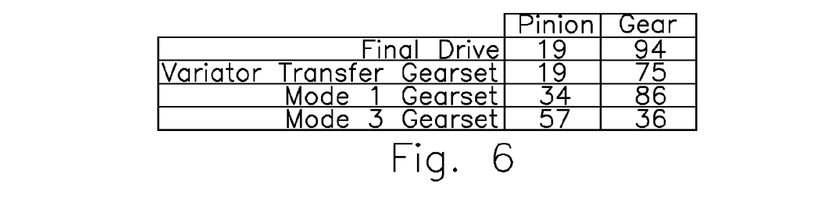
FIG. 6 shows preferred number of gear teeth of the transfer gearset, first mode gearset, third mode gearset, and the final drive of the transmissions of FIGS. 5 and 10.

FIG. 6 shows preferred number of gear teeth of the transfer gearset 20-22, first mode gearset 24-26, third mode gearset 72-74, and the final drive.

Figure 7:
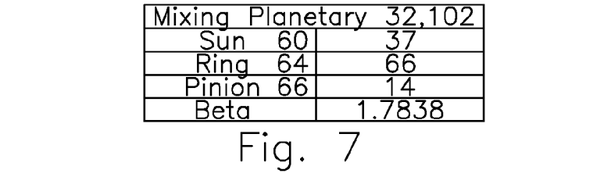
FIG. 7 shows the beta ratio, and a preferred number of gear teeth of the sun gear, ring gear and planet pinions of the mixing gearset of the transmissions of FIG. 5.

FIG. 7 shows the beta ratio, and a preferred number of gear teeth of the sun gear 60, ring gear 64 and planet pinions 66 of the mixing gearset 32.

Figure 8:
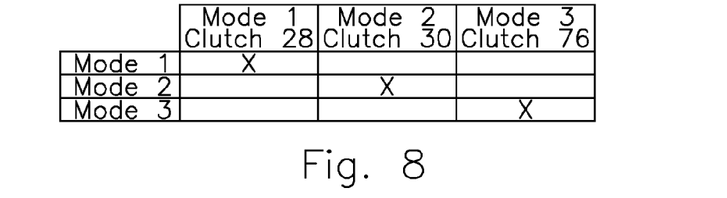
FIG. 8 shows the states of the clutches during operation in the three modes of the transmission of FIG. 5.

FIG. 8 shows the states of clutches 28, 30 and 76 during operation in the three modes.

Figure 9:
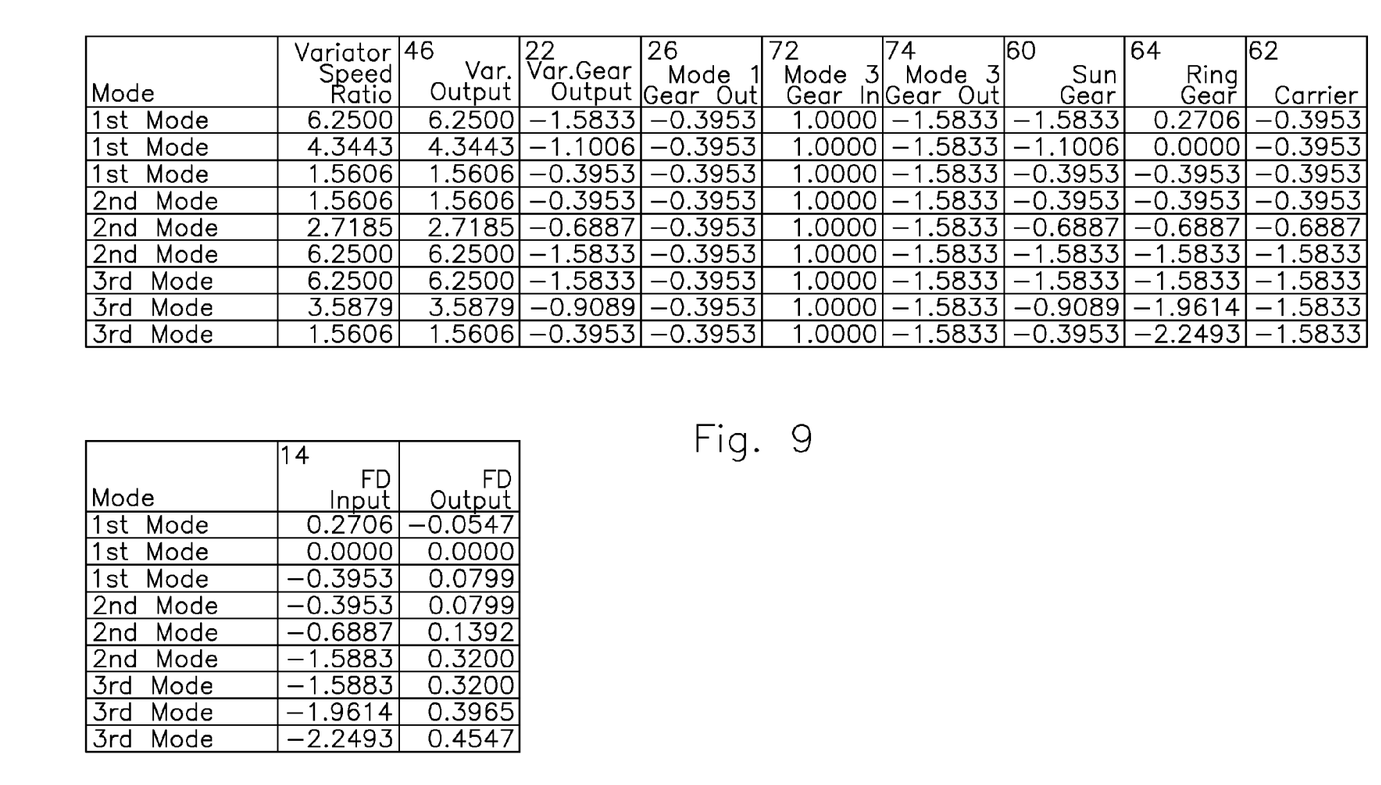
FIG. 9 is a chart showing the variation of the speed ratios of system components as the variator speed ratio changes in the transmission of FIG. 5.

As FIG. 9 shows, during a positive torque condition with transmission 70 operating in the first mode, the speed ratio of variator 18 is its maximum 6.2500 and engine speed is at reference speed 1.000, the speed of the variator output 46 is 6.2500, gear 22 and sun gear 60 is −1.5833, gear 26 and carrier 62 is −0.3953, ring gear 64 and final drive pinion 14 is 0.2706, and the final drive output is −0.0547.

The final drive output speed is zero when the speed ratio of variator 18 decreases to 4.3443 during first mode operation. The final drive output speed is 0.0799 when the speed ratio of variator 18 decreases further to 1.5606 during first mode operation.

During a positive torque condition with transmission 70 operating in the second mode, the speed ratio of variator 18 at its minimum 1.5606 and engine speed at 1.000, the speed of the variator output 46 is 1.5606, gear 22 and sun gear 60 is −0.3953, gear 26 is −0.3953, carrier 62 is −0.3953, ring gear 64 and final drive pinion 14 is −0.3953, and the final drive output is 0.0799.

The final drive output speed is 0.1392 when the speed ratio of variator 18 increases to 2.7185 during second mode operation. The final drive output speed is 0.3200 when the speed ratio of variator 18 increases further to 6.2500 during second mode operation.

During a positive torque condition with transmission 70 operating in the third mode, the speed ratio of variator 18 at its maximum 6.2500 and engine speed at 1.000, the speed of the variator output 46 is 6.2500, gear 22 and sun gear 60 is −1.5833, gear 26 is −0.3953, carrier 62 is −1.5833, ring gear 64 and final drive pinion 14 is −1.5833, and the final drive output is 0.3200.

The final drive output speed is 0.3965 when the speed ratio of variator 18 decreases to 3.5879 during third mode operation. The final drive output speed is 0.4547 when the speed ratio of variator 18 decreases further to 1.5606 during third mode operation.

Figure 10:
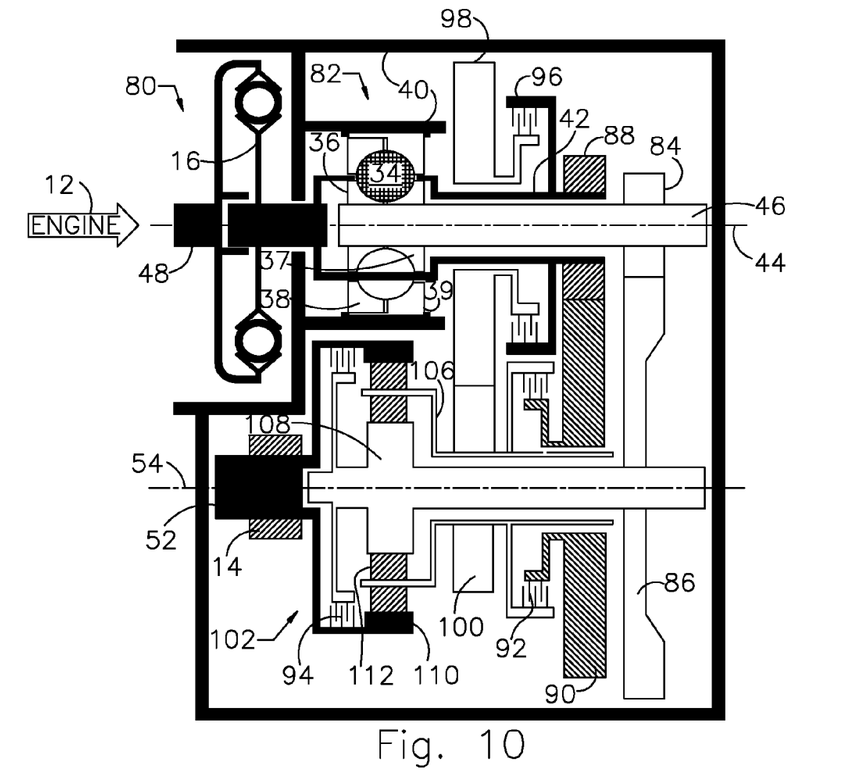
FIG. 10 is a schematic diagram of a triple-mode continuously variable transmission.

Referring now to FIG. 10, the transmission 80 transmits power between an engine 12 and the final drive pinion 14. Transmission 80 further includes a torsional damper 16; a Milner ball variator 82; a transfer gearset comprising pinion 84 and gear 86; a first mode gearset comprising pinion 88 and gear 90; a first mode clutch 92; a second mode clutch 94; a third mode clutch 96; a third mode gearset comprising pinion 98 and gear 100, and a mixing planetary gearset 102. Pinion 84 is secured to the variator output shaft 46. Gear 86 meshes with pinion 84 and is secured to sun gear 108. Pinion 88 is secured to variator input 42. Gear 90 meshes with pinion 88 and is journalled on carrier 106. Pinion 98 is journalled on variator input 42. Gear 100 meshes with pinion 98 and is secured to a carrier 106.

The Milner ball variator 82 includes spherical balls 34; split inner races 36, 37; split outer races 38, 39; and a ball carrier 42, secured to pinion 88. The races are each split, which allows the contact point between the balls and the races to be varied, thereby changing the speed ratio of the variator.

The inner races 36, 37 are secured to shaft 46, which is the variator output. The outer races 38, 39 are grounded, i.e., held against rotation on the case 40. The input to the variator 18 is the ball carrier 42, which driveably connects to engine shaft 48 through the torsion damper 16. The variator balls 34 revolve about axis 44 in the torus between the inner and outer races.

The variator 82 is combined with the mixing planetary gearset 102, the transfer gearset, first and third mode gearsets, and clutches 92, 94 and 96 to produce a multi-mode transmission 80. The damper 16 is connected to the engine shaft 48. The final drive pinion 14 is in mesh with a final drive gear (not shown), located on a differential/road wheel centerline.

For operation in the first mode, first mode clutch 92 is engaged, and clutches 94, 96 are disengaged. Power from engine 12 is transmitted from input 42 through gearset 88-90 and clutch 92 to the carrier 106 of the mixing planetary gearset 102. Power from engine 12 is also transmitted from output shaft 46 through gearset 84-86 to the sun gear 108 of the mixing planetary gearset 102. A third component of the mixing planetary gearset 102, ring gear 110, is connected to the output 52 revolving about axis 54 of the transmission 80. Planet pinions 112 are supported on carrier 106 and mesh with sun gear 108 and ring gear 110.

For operation in the second mode, clutches 92, 96 are disengaged, and second mode clutch 94 is engaged. In the second mode, power from engine 12 is transmitted from variator output 46 through gearset 84-86 to the sun gear 108 of the mixing planetary gearset 102. A third component of the mixing planetary gearset 102, ring gear 110, is also connected to variator output 46 due to the engagement of clutch 94, thereby bypassing the mixing planetary gearset 102. Output 52 is continually driven by variator output 46 through gearset 84-86 due to the engagement of clutch 94.

For operation in the third mode, clutches 92, 94 are disengaged, and third mode clutch 96 is engaged. During operation in the third mode, power from engine 12 is transmitted from variator output shaft 46 through gearset 84-86 to sun gear 108 of the mixing planetary gearset 102. Power from engine 12 is also transmitted from input shaft 42 through gearset 98-100 to the carrier 106 of the mixing planetary gearset 102 due to the engagement of third mode clutch 96. A third component of planetary gearset 102, e.g., ring gear 110, is connected to the final drive output pinion 14.

With proper selection of the planetary gearset's beta ratio and the speed ratios of the transfer gearsets 84-86, 88-90, 98-100, operation in the first mode will produce reverse drive, neutral, and low speed forward drive ranges. In addition, a node point is produced, at which the overall speed ratios in the adjacent modes overlap to allow smooth switching between modes.

FIG. 6 shows preferred number of gear teeth of the transfer gearset 84-86, first mode gearset 88-90, third mode gearset 98-100, and the final drive.

Figure 11:
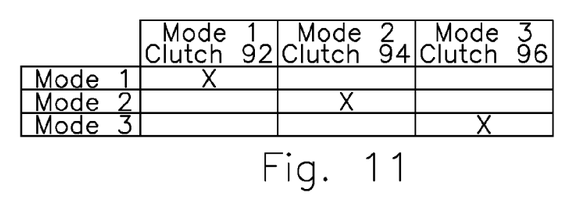
FIG. 11 shows the states of the clutches during operation in the three modes of the transmission of FIG. 10.

FIG. 11 shows the states of clutches 92, 94, 96 during operation in the three modes.

Figure 12:
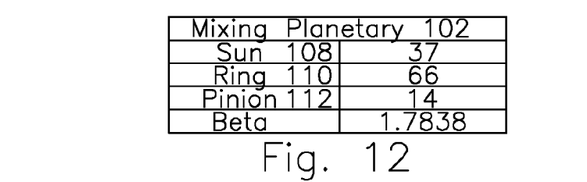
FIG. 12 shows the beta ratio, and a preferred number of gear teeth of the sun gear, ring gear and planet pinions of the mixing gearset of the transmission of FIG. 10.

FIG. 12 shows the beta ratio, and a preferred number of gear teeth of the sun gear 108, ring gear 110 and planet pinions 108 of the mixing gearset 102.

Figure 13:
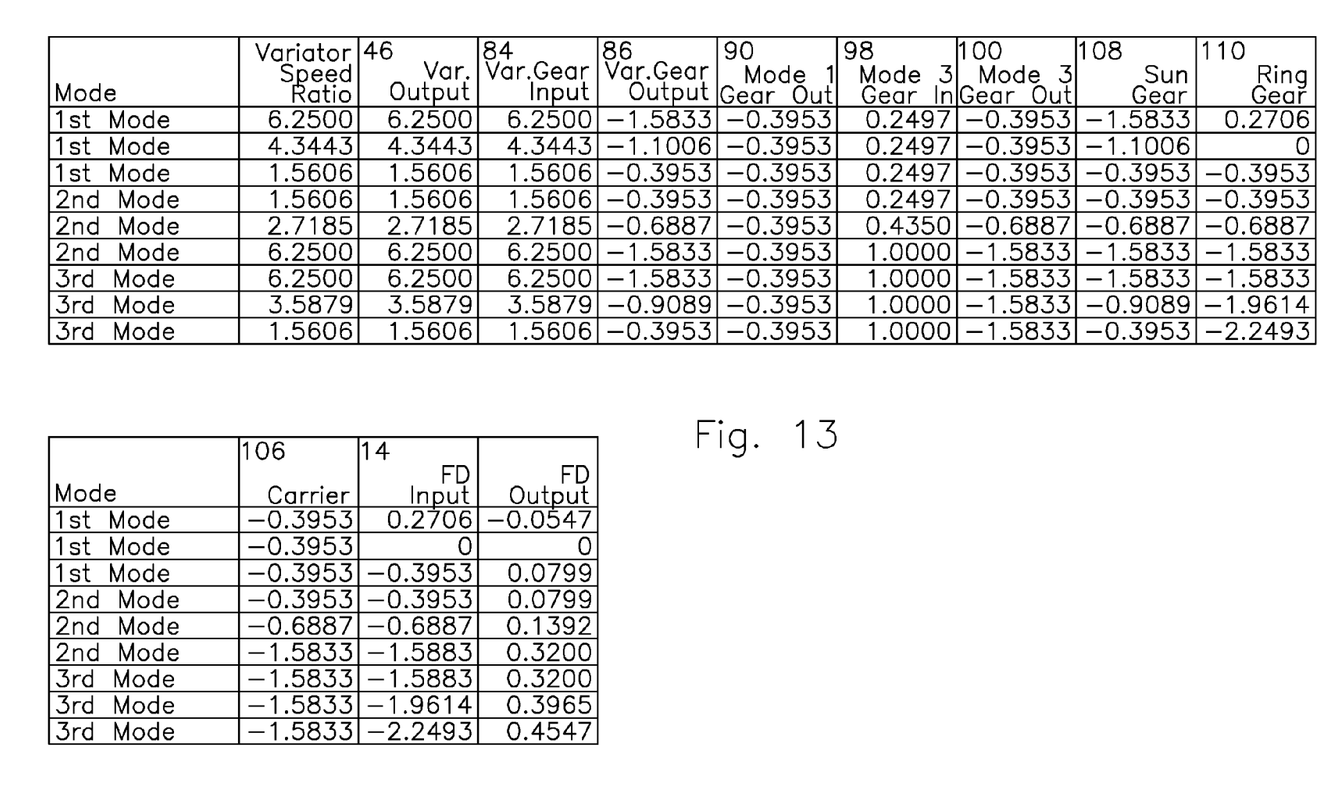
FIG. 13 is a chart showing the variation of the speed ratios of system components as the variator speed ratio changes in the transmission of FIG. 10.

As FIG. 13 shows, during a positive torque condition with transmission 80 operating in the first mode, the speed ratio of variator 82 is its maximum 6.2500 and engine speed is at reference speed 1.000, the speed of the sun gear 108 is −1.5833, gear 90 and carrier 106 is −0.3953, and final drive pinion 14 is 0.2706, and the final drive output is −0.0547.

The final drive output speed is zero when the speed ratio of variator 82 decreases to 4.3443 during first mode operation.

The final drive output speed is 0.0799 when the speed ratio of variator 82 decreases further to 1.5606 during first mode operation.

During a positive torque condition with transmission 80 operating in the second mode, the speed ratio of variator 82 at its minimum 1.5606 and engine speed at 1.000, the speed of the sun gear 108 is −0.3953, gear 90 is −0.3953, carrier 106 is −0.3953, ring gear 110 and final drive pinion 14 is −0.3953, and the final drive output is 0.0799.

The final drive output speed is 0.1392 when the speed ratio of variator 82 increases to 2.7185 during second mode operation. The final drive output speed is 0.3200 when the speed ratio of variator 82 increases further to 6.2500 during second mode operation.

During a positive torque condition with transmission 80 operating in the third mode, the speed ratio of variator 82 at its maximum 6.2500 and engine speed at 1.000, the speed of sun gear 108 is −1.5833, gear 90 is −0.3953, carrier 106 is −1.5833, ring gear 110 and final drive pinion 14 is −1.5833, and the final drive output is 0.3200.

The final drive output speed is 0.3965 when the speed ratio of variator 82 decreases to 3.5879 during third mode operation. The final drive output speed is 0.4547 when the speed ratio of variator 82 decreases further to 1.5606 during third mode operation.

In second mode of both the dual mode transmission 10 and triple mode transmissions 70, 80, the powerpath is entirely through the ball variator 18, 82.

In the third mode of the triple mode transmissions 70, 80, the powerflow is split, so that the variator 18, 82 only sees part of the power, thereby reducing variator efficiency losses.

In accordance with the provisions of the patent statutes, the preferred embodiment has been described. However, it should be noted that the alternate embodiments can be practiced otherwise than as specifically illustrated and described.

The invention claimed is:

1. A transmission, comprising:
   an input;
   a variator including an output and a ball carrier secured to the input, producing a variable speed ratio between the ball carrier and the output;
   a gearset including a component connected to the output, and second and third components;
   a first clutch connecting the input and the second component;
   a second clutch connecting the component and the third component.

2. The transmission of claim 1, wherein:
   the variator is a Milner ball variator that further includes a race secured to the output, a second race held against rotation, a ball engaging the race and the second race, and driven by the ball carrier.

3. The transmission of claim 1, further comprising:
   a first pinion secured to the input;
   a first gear meshing with the first pinion, the first clutch connecting the input and the second component through the first pinion and the first gear.

4. The transmission of claim 1, further comprising:
   a second pinion secured to the output;
   a second gear meshing with the second pinion, secured to the component, the second clutch connecting the output and the third component through the second pinion, the second gear, and the component.

5. The transmission of claim 1, wherein:
   the component is a sun gear;
   the second component is a carrier;
   the third component is a ring gear; and the gearset further comprises planet pinions supported on the carrier and meshing with the sun gear and the ring gear.

6. The transmission of claim 1, further comprising:
a third pinion secured to the input;
a third gear journalled on the second component and meshing with the third pinion; and
a third clutch connecting the input and the second component through the third pinion and the third gear.

7. The transmission of claim 1, further comprising:
a third pinion journalled on the input;
a third gear secured to the second component and meshing with the third pinion; and
a third clutch connecting the input and the second component through the third pinion and the third gear.

8. The transmission of claim 1, further comprising:
a third pinion journalled on the input;
a third gear meshing with the third pinion and secured to the second component.

9. The transmission of claim 1, further comprising:
a third pinion secured to the input;
a third gear journalled on the second component and meshing with the third pinion.

10. A transmission, comprising:
an input;
a variator including an output and a ball carrier connected to the input, producing a variable speed ratio between the ball carrier and the output;
a gearset including a component connected to the output, and second and third components;
a first clutch connecting the input and the second component;
a second clutch connecting the component and the third component;
a third clutch connecting the input and the second component.

11. The transmission of claim 10, wherein:
the component is a sun gear;
the second component is a carrier;
the third component is a ring gear; and
the gearset further comprises planet pinions supported on the carrier and meshing with the sun gear and the ring gear.

12. The transmission of claim 10, further comprising:
a first pinion secured to the input;
a first gear meshing with the first pinion, the first clutch connecting the input and the second component through the first pinion and the first gear.

13. The transmission of claim 10, further comprising:
a second pinion secured to the output;
a second gear meshing with the second pinion and secured to the component.

14. The transmission of claim 10, further comprising:
a third pinion journalled on the input;
a third gear meshing with the third pinion and secured to the second component, the third clutch connecting the input and the second component through the third pinion and the third gear.

15. The transmission of claim 10, further comprising:
a third pinion secured to the input;
a third gear meshing with the third pinion and journalled on the second component, the third clutch connecting the input and the second component through the third pinion and the third gear.

16. A transmission, comprising:
an input;
a variator including an output and a ball carrier connected to the input, producing a variable speed ratio between the ball carrier and the output;
a gearset including a component, a second component and a third component;
a first gearset comprising a pinion secured to the input and a first gear meshing with the first pinion;
a first clutch releaseably connecting the first gear and the second component;
a second gearset comprising a second pinion secured to the output and a second gear meshing with the second pinion and secured to the component;
a second clutch releaseably connecting the component and the third component.

17. The transmission of claim 16, further comprising:
a third gearset comprising a third pinion journalled on the input, and a third gear meshing with the third pinion and secured to the second component; and
a third clutch releaseably connecting the input and the second component through the third pinion and third gear.

18. The transmission of claim 16, further comprising:
a third gearset comprising a third pinion secured to the input, and a third gear meshing with the third pinion and journalled on the second component; and
a third clutch releaseably connecting the input and the second component through the third pinion and third gear.

19. The transmission of claim 16, wherein:
the component is a sun gear;
the second component is a carrier; and
the third component is a ring gear;
the gearset further comprises planet pinions supported on the carrier and meshing with the sun gear and the ring gear.

20. The transmission of claim 16, wherein:
the variator is a Milner ball variator that further includes a race secured to the output, a second race held against rotation, a ball engaging the race and the second race, and driven by the ball carrier.

* * * * *